United States Patent [19]

Cesar et al.

[11] 4,436,132

[45] Mar. 13, 1984

[54] BEAD RINGS FOR TIRES

[75] Inventors: Jean-Pierre Cesar, Sayat; Jean-Louis Charvet, Clermont-Ferrand, both of France

[73] Assignee: Compagnie Generale des Etablissements Michelin, Clermont-Ferrand, France

[21] Appl. No.: 384,915

[22] Filed: Jun. 4, 1982

[30] Foreign Application Priority Data

Jul. 20, 1981 [FR] France .................. 81 14228

[51] Int. Cl.³ .................. B60C 15/04; B29H 17/32
[52] U.S. Cl. .................. 152/362 R; 156/136; 245/1.5; 57/201; 57/213; 57/218; 57/224; 57/230; 57/902
[58] Field of Search .............. 152/362 R, 391, 359; 156/136; 245/1.5; 57/201, 213-217, 218-223, 224, 229, 230, 232-234, 258-259, 902

[56] References Cited

U.S. PATENT DOCUMENTS

| 1,434,721 | 11/1922 | Pratt . | |
| 1,565,616 | 12/1925 | Beyea . | |
| 3,736,974 | 6/1973 | Lejuene | 152/362 R |
| 3,741,507 | 6/1973 | Hahn | 245/1.5 |
| 3,841,377 | 10/1974 | Montagne | 152/362 CS |
| 3,861,442 | 1/1975 | Bertrand | 152/362 R |
| 4,320,791 | 3/1982 | Fujii et al. | 57/902 |

FOREIGN PATENT DOCUMENTS 622364 12/1962 Belgium .................. 152/362 R

Primary Examiner—Lois E. Boland
Attorney, Agent, or Firm—Brumbaugh, Graves, Donohue & Raymond

[57] ABSTRACT

In order to obtain a bead ring for tires which is both lighter and stronger than the known bead rings, the bead ring is formed of an annular core, for example of steel, surrounded by at least one layer formed of at least one strand of continuous nonmetallic filaments which are practically parallel to each other and free of impregnation, which strand is wound around the core in the same direction to a layer thickness at least equal to twice the average diameter of a filament and with a winding pitch p less than $2\sqrt{ac}$ (in which a is the radius of a circle equivalent to the perimeter of the cross section of the core and c is the average circumference of the core) and a twist in the same direction as the winding and equal to one turn per pitch.

10 Claims, 4 Drawing Figures

BEAD RINGS FOR TIRES

The present invention relates to improvements in tires and more particularly in annular bead rings intended to reinforce the beads of tires.

A tire consists essentially of an annular crown extended laterally by two sidewalls each of which is terminated by a bead intended to sit on the tire rim. Each bead has at least one annular bead ring arranged in the circumferential direction concentric to the axis of rotation of the tire. The essential functions of the bead ring consist in serving as anchoring for the carcass reinforcement and in insuring the clamping of the bead to the tire rim.

Contrary to the carcass reinforcement, which deforms when the tire is under load, the bead ring is held immobile on the rim, resisting the stresses developed, on the one hand, by the carcass reinforcement and, on the other hand, by the reaction due to the clamping of the rim. It is therefore sought to manufacture bead rings which are both light and strong, in particular resistant to rupture by traction.

Usually bead rings are made of steel wires. Although steel imparts a satisfactory resistance to rupture, bead rings of steel wires are heavy.

The bead rings of the package type are formed by winding a number of turns of steel wire alongside of each other in the groove of a pulley so as to form a ring of parallel wires. Such bead rings are used particularly in tires for passenger cars. They can be made with different radial sections. With the appearance of artificial or synthetic textile filaments which are light and increasingly resistant to traction (for instance, rayon, polyesters, aromatic or nonaromatic polyamides, polyvinyl alcohols, glass, boron, carbon) it has been attempted to decrease the weight of the packaged bead rings by winding previously sized filaments in accordance with the same method as used for the manufacture of packaged bead rings of steel wire.

These packaged bead rings of textile filaments have one defect which makes them unsuitable for use in tires. When upon mounting the tire on the rim, the bead of the tire is caused to pass over the flange of the rim by means of the mounting iron, the bead ring is subjected locally to flexure. Despite the fact that they are sized, the filaments located along and in the vicinity of the radially inner face of the bead ring are subjected to buckling. The bead ring therefore no longer has sufficient resistance to rupture at the place where the flexing has taken place.

The object of the invention is to overcome this major drawback of packaged bead rings of sized textile filaments.

For this purpose, in accordance with the invention, a tire bead ring is used which is formed of an annular core and an assembly of wires arranged on the core and surrounding it, characterized by the fact that the assembly of wires is constituted of at least one layer formed of at least one strand of continuous nonmetallic filaments which are practically parallel to each other and free of impregnation, which strand is wound around the core in the same direction to a layer thickness at least equal to twice the average diameter of a filament and with a winding pitch p less than $2\sqrt{ac}$ (in which a is the radius of a circle equivalent to the perimeter of the cross section of the core and c is the average circumference of the core) and a twist in the same direction as the winding and equal to one turn per pitch.

The filaments used within the scope of the invention preferably have a cross section which is at most equal to $0.1 \text{ mm}^2$.

By strand there is meant a bundle of continuous practically parallel filaments under the tension necessary for the winding of the strand upon the manufacture of the bead rings in accordance with the invention. The filaments forming a strand may be of a single nonmetallic material, for instance of glass or of aromatic polyamides. However, at least some strands may also be formed by combining filaments of at least two different nonmetallic materials, for instance some of glass and others of aromatic polyamides, or of polyvinyl alcohols and aromatic polyamides, or of polyvinyl alcohols, glass and aromatic polyamides.

By impregnation-free filament there is meant a filament whose surface bears no substance capable of creating a bond from filament to filament of the same strand. However, filaments which have received only a sizing at the time of their manufacture (for instance in order to prevent their intertangling or adhering to each other) are considered to be free of impregnation.

The cross section of the core is the intersection of the core with a plane containing the axis of revolution of the bead ring. If, for instance, the core has a square cross section of side b, the perimeter will be equal to $4b$ and the radius a of the equivalent circle is such that $a = 2b/\pi$. The average circumference c of the core is the length of the circle which is the locus of the centers of gravity of the cross sections of the core. The core may be of metal, for example steel, or else formed of filaments embedded in a material having a high modulus of elasticity, for example an epoxy or polyester resin.

In accordance with the invention, the pitch of the filaments of a strand is relatively short. The tension of the filaments, which are independent of each other due to the absence of impregnation, is practically identical within the strand. Thus the assembly of filaments has intimate contact with the core. The filaments of a layer are intermeshed in each other. The assembly of filaments nevertheless has sufficient permeability in order, after the manufacture of the bead rings in accordance with the invention, to receive an impregnation or surface treatment which imparts adherence with the materials adjacent to the bead rings in the beads of the tire. This permeability is also sufficient to favor the bonding of the bead rings of the invention with the pourable and then cross-linkable materials of which certain tires are formed, for instance those tires which do not have reinforcement plies.

As compared with bead rings formed of ordinary steel wires of 0.5 millimeter to several millimeters in diameter, the invention makes it possible to obtain bead rings which are much lighter for the same strength. When using, for instance, strands of filaments of aromatic polyamides one has filaments which, for the same weight, are five times more resistant to rupture under stretch than steel wires are.

The use of filaments of a cross section at most equal to $0.1 \text{ mm}^2$ takes it possible, on the one hand, to wind the strands with a twist in the same direction as the winding and equal to one turn per pitch of winding. Hence a simplification in the manufacturing equipment which is impossible with the steel wires used in industry. One variant of the invention consists in making bead rings in which the winding pitch of the strand varies from the start to the end of the winding constituting the layer, preferably by an increase of winding pitch, the winding pitch however remaining at all times less than $2\sqrt{a_1 c}$, (in which $a_1$ is the radius of the circle equivalent to the perimeter of the cross section of the bead ring during the course of manufacture at the place where the strand is wound—this perimeter being evaluated in the manner indicated above in the case of the core—and c is the average circumference of the core—as defined above).

Such an arrangement makes it possible to make the stresses acting on the filaments uniform as their distance from the core increases.

Although it is preferable to increase the pitch continuously by winding the strand or strands so as to form a layer, one can also maintain the winding pitch constant during the production of one layer, for instance the one closest to the core, and then vary and preferably increase it by a given value in order to produce the following layer.

The invention also covers variants in which the assembly of wires arranged on and surrounding the core is constituted of at least two layers which differ from each other in at least one of the following properties: winding pitch, direction of the winding around the core, average diameter of the filaments and nature of the filaments forming the strand. The reversal of the direction of winding of the strand or strands from one layer to the next decreases the risk of nonplanarity of the bead rings, particularly when it is desired to use a relatively flexible core instead of a rigid core.

The drawing shows one embodiment of a bead ring in accordance with the invention. In the drawing.

Figure 1:
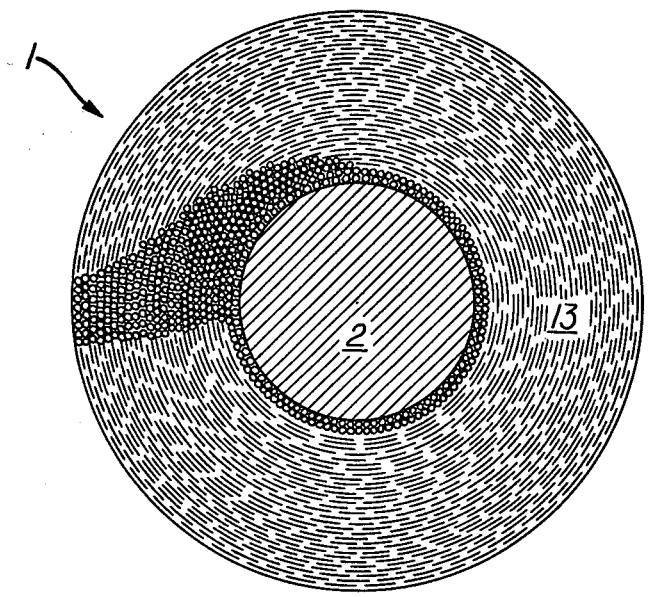
FIG. 1 is a sectional view in greatly enlarged cross section of a bead ring formed of a core and of a layer of filaments made by winding.
Figure 2:
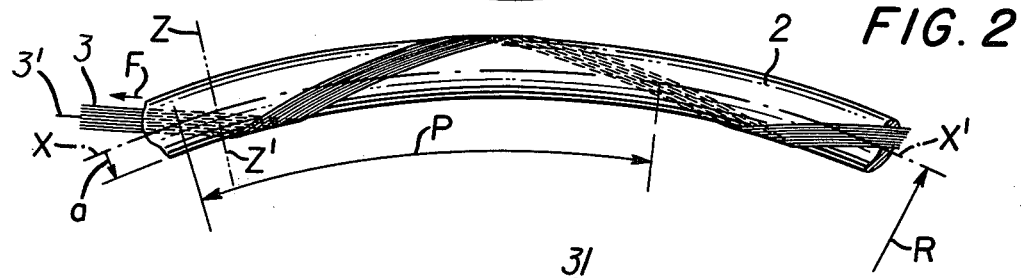
FIG. 2 shows, on a smaller scale than FIG. 1, a strand of filaments wound around the core of the bead ring of FIG. 1.

The bead ring 1 whose cross section is shown greatly enlarged in FIG. 1 is composed, on the one hand, of a core 2 of steel, of circular cross section, formed of an annular loop closed by welding together the two ends of a wire cut to suitable length, and, on the other hand, of a strand 3 (FIG. 2) of filaments 3' of aromatic polyamide which are substantially parallel to each other and assume the appearance of a ribbon when this strand, as indicated by the arrow F in FIG. 2, is wound under tension to form a layer 13 of filaments.

The cross section of the core 2 has a diameter of 2 mm (radius a = 1 mm). The bead ring 1 has an average circumference (c) of 1136 mm (R = 181 mm).

The filaments 3' of the strand 3 have an average diameter of 17 μm and the strand 3 has a linear density of 330 tex. A strand such as 3 is wound helicoidally (FIG. 2) around the core 2, the winding pitch p of this strand around the core 2 being about 45 mm. The strand 3 has not been subjected to impregnation.

In the bead ring whose cross section has a diameter equal to 4.8 mm, the nonimpregnated strand 3 can be counted up to 46 times in this cross section.

The bead ring which is thus formed weighs 46 g while an ordinary bead ring entirely of steel wire and of the same size weighs 130 g.

A bead ring in accordance with the invention arranged in each of the beads of a tire of size 175-14 withstands an inflation pressure of up to 15 bars while an ordinary bead ring does not permit the exceeding of 13.5 bars.

When a bead ring, whose dimensions "a" and "c" of which are the same as those of the bead ring of the invention described above, is made with a strand whose filaments have been previously impregnated, the tire provided with it does not withstand a pressure of more than 9 bars.

FIG. 2 is a view, seen in the direction of the axis of revolution of the tire, of a segment of bead ring 1 in accordance with the invention. In this figure, the circumferential direction XX', the radial direction ZZ', the radius a of the core 2 of circular cross section and the radius R of the average circumference C of the bead ring 1 with reference to the axis of revolution are shown. There can also be noted the laying pitch p of a strand 3 around the core 2 of the bead ring 1.

Figure 3:
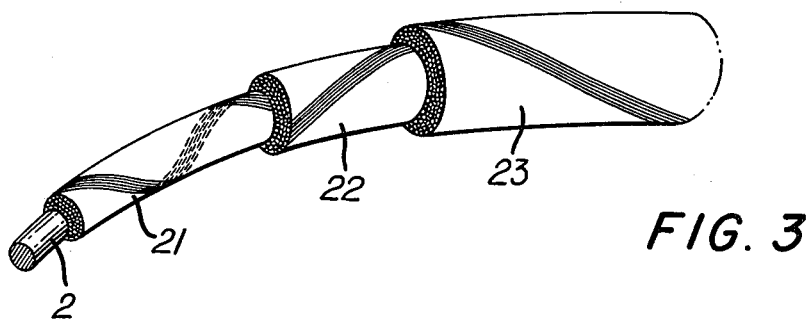
FIG. 3 shows a bead-ring segment, the core of which is surrounded by three layers each composed of a strand of filaments.

FIG. 3 shows a segment of a bead ring formed of a steel core 2 which is similar to that described with reference to FIGS. 1 and 2 and of three layers 21, 22 and 23, each formed by the winding of a strand of filaments which is similar to the strand 3 of Figs. 1 and 2. The direction of winding of the strand alternates from one layer to the next; the winding pitch increases from the inner layer 21 to the following layers 22, 23.

Figure 4:
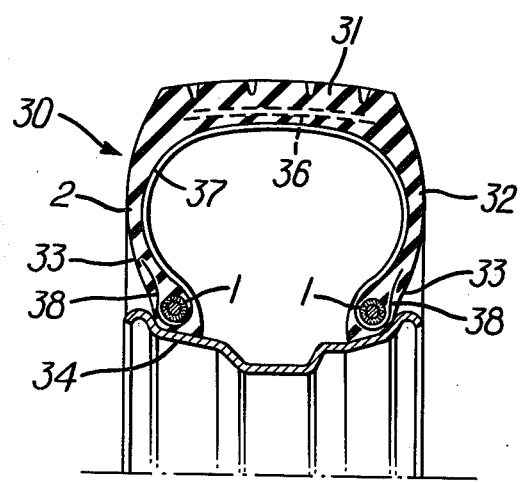
FIG. 4 is a sectional view of a tire having a bead ring in accordance with the invention provided in each of the beads.

FIG. 4 shows a cross section through a tire 30 formed of a crown 31 and of two sidewalls 32, one arranged on each side of the crown 31. Each of the sidewalls 32 terminates in a bead 33 which rests on a rim 34. Each bead 33 has a bead ring 1 in accordance with the invention, around which a carcass reinforcement 37 is anchored by the outwardly upward turn 38. A reinforcement 36 which is known per se is provided in the crown 31.

What is claimed is:

1. A bead ring for a tire bead formed of an annular core and an assembly of wires arranged on the core and surrounding it, characterized by the fact that the assembly of wires is constituted of at least one layer formed of at least one strand of continuous nonmetallic filaments which are practically parallel to each other and free of impregnation, which strand is wound around the core in the same direction to a layer thickness at least equal to twice the average diameter of a filament and with a winding pitch p less than $2\sqrt{ac}$ (in which a is the radius of a circle equivalent to the perimeter of the cross section of the core and c is the average circumference of the core) and a twist in the same direction as the winding and equal to one turn per pitch.

2. A bead ring according to claim 1, characterized by the fact that the winding pitch of the strand varies from the start to the end of the winding constituting the layer, preferably by an increase of winding pitch, the winding pitch however remaining at all times less than $2\sqrt{a_1 c}$ (in which $a_1$ is the radius of the circle equivalent to the perimeter of the cross section of the bead ring during the course of manufacture at the place where the strand is wound and c is the average circumference of the core).

3. A bead ring according to claim 1 or 2, characterized by the fact that the assembly of wires arranged on and surrounding the core is constituted of at least two layers which differ from each other in at least one of the following properties: winding pitch, direction of winding around the core, average diameter of the filaments and nature of the filaments forming the strand.

4. A bead ring according to claim 1 or 2, characterized by the fact that the assembly of wires arranged on and surrounding the core is constituted of at least two layers and by the fact that the winding pitch varies and preferably increases from the layer closest to the core to the following layer.

5. A bead ring according to claim 1 or 2, characterized by the fact that at least an outer layer of filaments comprises an impregnation or a superficial bonding coating applied after the manufacture of the bead ring.

6. A bead ring according to claim 1 or 2, characterized by the fact that the core is of metal, for example of steel.

7. A bead ring according to claim 1 or 2, characterized by the fact that the core has a circular cross section.

8. A bead ring according to claim 1 or 2, characterized by the fact that the core is rigid.

9. A bead ring according to claim 1 or 2, characterized by the fact that the core is formed of filaments embedded in a material having a high modulus of elasticity, for example an epoxy or polyester resin.

10. A bead ring according to claim 1 or 2, characterized by the fact that at least some strands are formed of filaments of at least of two different materials.

* * * * *